US009688107B2

United States Patent
Wada

(10) Patent No.: US 9,688,107 B2
(45) Date of Patent: *Jun. 27, 2017

(54) TIRE PRESSURE DECREASE DETECTION APPARATUS AND METHOD, AND COMPUTER READABLE MEDIUM THEREFOR

(71) Applicant: SUMITOMO RUBBER INDUSTRIES, LTD., Kobe-shi, Hyogo (JP)

(72) Inventor: Mitsuhiro Wada, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 1148 days.

This patent is subject to a terminal disclaimer.

(21) Appl. No.: 13/788,614

(22) Filed: Mar. 7, 2013

(65) Prior Publication Data

US 2014/0046602 A1    Feb. 13, 2014

(30) Foreign Application Priority Data

Aug. 7, 2012  (JP) ................................. 2012-175042

(51) Int. Cl.
   *B60C 23/00*   (2006.01)
   *B60C 23/06*   (2006.01)

(52) U.S. Cl.
   CPC ............ *B60C 23/00* (2013.01); *B60C 23/062* (2013.01)

(58) Field of Classification Search
   CPC .............................. B60C 23/00; B60C 23/062
   See application file for complete search history.

(56) References Cited

U.S. PATENT DOCUMENTS

| 5,407,259 A | * | 4/1995 | Itabashi | ................ B60T 8/1764 303/147 |
| 8,279,056 B2 | | 10/2012 | Fujita et al. | |

(Continued)

FOREIGN PATENT DOCUMENTS

| JP | 8-101085 A | 4/1996 |
| JP | 2002-87031 A | 3/2002 |

(Continued)

OTHER PUBLICATIONS

Japanese Office Action, dated Jun. 17, 2014, for Japanese Application No. 2012-175042.

*Primary Examiner* — Manuel Rivera Vargas
(74) *Attorney, Agent, or Firm* — Birch, Stewart, Kolasch & Birch, LLP

(57) ABSTRACT

A tire pressure decreased detection apparatus comprising rotation speed information detection means, rotation acceleration information calculation means, resonance frequency estimate means for time-series estimating a torsional resonance frequency of the rotation speed information, correlation calculation means for, regarding left and right wheels of driving wheels, calculating a time series correlation of the rotation acceleration information of the left and right wheels, and determination means for determining a decrease in pressure of the tires based on the estimated torsional resonance frequency. In a case where the correlation exceeds a predetermined threshold value, the resonance frequency estimate means stops estimating the torsional resonance frequency.

6 Claims, 11 Drawing Sheets

1:WHEEL SPEED DETECTION MEANS
2:CONTROL UNIT
3:DISPLAY
4:INITIALIZATION BUTTON
5:ALARM

(56) References Cited

U.S. PATENT DOCUMENTS

| | | |
|---|---|---|
| 8,299,909 B2 | 10/2012 | Fujita et al. |
| 2002/0057196 A1 | 5/2002 | Sugisawa |
| 2010/0013617 A1* | 1/2010 | Fujita ................ B60C 23/062 340/443 |

FOREIGN PATENT DOCUMENTS

| | | |
|---|---|---|
| JP | 2004-322821 A | 11/2004 |
| JP | 2007-155525 A | 6/2007 |
| JP | 2010-23546 A | 2/2010 |
| JP | 2010-23673 A | 2/2010 |

* cited by examiner

1: WHEEL SPEED DETECTION MEANS
2: CONTROL UNIT
3: DISPLAY
4: INITIALIZATION BUTTON
5: ALARM

TIRE PRESSURE DECREASE DETECTION APPARATUS AND METHOD, AND COMPUTER READABLE MEDIUM THEREFOR

TECHNICAL FIELD

The present invention relates to a tire pressure decrease detection apparatus and a method, and a computer readable medium therefor. Further in detail, the present invention relates to a tire pressure decrease detection apparatus and a method, and a computer readable medium therefor for detecting a decrease in pressure of tires based on a torsional resonance frequency of the tires of a traveling vehicle.

BACKGROUND ART

One of factors for letting an automobile safely travel includes pressure of a tire. When the pressure is decreased to less than a proper value, operating stability and fuel consumption are deteriorated, so that a tire burst may sometimes be caused. Therefore, a tire pressure monitoring system (TPMS) for detecting a decrease in tire pressure and issuing an alarm so as to urge a driver to take a proper action is an important technique from a view of protecting an environment and ensuring safety of the driver.

The conventional monitoring system can be classified into two types including a direct detection type and an indirect detection type. The direct detection type is to directly measure the pressure of the tire by incorporating pressure sensors inside a tire wheel. Although the decrease in the pressure can be detected with high precision, some disadvantages in terms of technique and cost remain including a need for a dedicated wheel and a problem in fault tolerance in an actual environment.

Meanwhile, the indirect detection type is a method for estimating the pressure from rotation information of the tire, and can further be classified into a DLR (Dynamic Loaded Radius) method and a RFM (Resonance Frequency Mechanism) method. Among them, the RFM method can solve problems in the DLR method (problems such as incapability of detecting four-tire simultaneous deflation because relative comparison of rotation speed of wheels is the basic principle), and various techniques are proposed (for example, refer to Patent Literatures 1 to 2).

The RFM method in the inventions described in Patent Literatures 1 to 2 and the like utilizes a characteristic that a torsional resonance frequency of the tire is lowered by deflation and time-series estimates the torsional resonance frequency of the tire from rotation speed information or rotation acceleration information of the tire so as to detect the decrease in the pressure of the tire.

CITATION LIST

Patent Literature

Patent Literature 1: Japanese Unexamined Patent Publication No. 2010-023546
Patent Literature 2: Japanese Unexamined Patent Publication No. 2010-023673

SUMMARY OF INVENTION

Technical Problem

However, in driving wheels of the vehicle, there is sometimes a case where a periodic noise is generated in the vicinity of the torsional resonance frequency of the tire due to vehicle speed, a gear position, or the like. In this case, the resonance frequency time-series estimated by the AR model is pulled by such a periodic noise and hence becomes a different value from the original torsional resonance frequency of the tire. As a result, there is a fear that an erroneous alarm or non-alarm is caused in the TPMS.

The present invention has been made in view of the above circumstances, and an objective thereof is to provide a tire pressure decrease detection apparatus and a method, and a computer readable medium therefor capable of removing or suppressing an influence of a periodic noise due to driving wheels so as to eliminate an erroneous alarm or non-alarm of a decrease in tire pressure.

Solution to Problem (1) A tire pressure decrease detection apparatus (hereinafter, also simply referred to as the "detection apparatus") according to a first aspect of the present invention includes:
rotation speed information detection means for regularly detecting rotation speed information of tires of wheels of a vehicle,
rotation acceleration information calculation means for calculating rotation acceleration information of the tires from the rotation speed information obtained by the rotation speed information detection means,
resonance frequency estimate means for time-series estimating a torsional resonance frequency of the rotation speed information from the rotation speed information obtained by the rotation speed information detection means,
correlation calculation means for, regarding left and right wheels of driving wheels, calculating a time series correlation of the rotation acceleration information of the left and right wheels calculated by the rotation acceleration information calculation means, and
determination means for determining a decrease in pressure of the tires based on the estimated torsional resonance frequency,
wherein in a case where the correlation calculated by the correlation calculation means exceeds a predetermined threshold value, the resonance frequency estimate means takes that a periodic noise from the driving wheels of the vehicle is generated in the vicinity of the torsional resonance frequency and stops estimating the torsional resonance frequency.

In the detection apparatus of the present invention, in a case where the correlation calculated by the correlation calculation means exceeds the predetermined threshold value, the resonance frequency estimate means takes that the periodic noise from the driving wheels of the vehicle is generated in the vicinity of the torsional resonance frequency and stops estimating the torsional resonance frequency. Thus, an influence of the periodic noise due to the driving wheels can be removed or suppressed so as to eliminate an erroneous alarm or non-alarm of the decrease in the tire pressure.

(2) A detection apparatus according to a second aspect of the present invention includes:
rotation speed information detection means for regularly detecting rotation speed information of tires of wheels of a vehicle,
rotation acceleration information calculation means for calculating rotation acceleration information of the tires from the rotation speed information obtained by the rotation speed information detection means, resonance frequency estimate means for time-series estimating a torsional resonance frequency of the rotation acceleration information from the rotation acceleration information obtained by the rotation acceleration information detection means, correlation calculation means for, regarding left and right wheels of driving wheels, calculating a time series correlation of the rotation acceleration information of the left and right wheels calculated by the rotation acceleration information calculation means, and determination means for determining a decrease in pressure of the tires based on the estimated torsional resonance frequency, wherein in a case where the correlation calculated by the correlation calculation means exceeds a predetermined threshold value, the resonance frequency estimate means takes that a periodic noise from the driving wheels of the vehicle is generated in the vicinity of the torsional resonance frequency and stops estimating the torsional resonance frequency.

(3) Preferably, the detection apparatus of (1) or (2) described above further includes a band-pass filter for letting only a frequency bandwidth in the vicinity of the torsional resonance frequency pass, wherein the correlation calculation means calculates a time series correlation of the rotation acceleration information of the left and right wheels passing through the band-pass filter.

(4) A tire pressure decrease detection method (hereinafter, also simply referred to as the "detection method") according to a third aspect of the present invention includes:

a rotation speed information detection step for regularly detecting rotation speed information of tires of wheels of a vehicle, a rotation acceleration information calculation step for calculating rotation acceleration information of the tires from the rotation speed information obtained in the rotation speed information detection step, a resonance frequency estimate step for time-series estimating a torsional resonance frequency of the rotation speed information from the rotation speed information obtained in the rotation speed information detection step, a correlation calculation step for, regarding left and right wheels of driving wheels, calculating a time series correlation of the rotation acceleration information of the left and right wheels calculated in the rotation acceleration information calculation step, and a determination step for determining a decrease in pressure of the tires based on the estimated torsional resonance frequency, wherein in a case where the correlation calculated in the correlation calculation step exceeds a predetermined threshold value, the resonance frequency estimate step takes that a periodic noise from the driving wheels of the vehicle is generated in the vicinity of the torsional resonance frequency and stops estimating the torsional resonance frequency.

In the detection method of the present invention, in a case where the correlation calculated in the correlation calculation step exceeds the predetermined threshold value, the resonance frequency estimate step takes that the periodic noise from the driving wheels of the vehicle is generated in the vicinity of the torsional resonance frequency and stops estimating the torsional resonance frequency. Thus, the influence of the periodic noise due to the driving wheels can be removed or suppressed so as to eliminate the erroneous alarm or the non-alarm of the decrease in the tire pressure.

(5) A detection method according to a fourth aspect of the present invention includes:

a rotation speed information detection step for regularly detecting rotation speed information of tires of wheels of a vehicle, a rotation acceleration information calculation step for calculating rotation acceleration information of the tires from the rotation speed information obtained in the rotation speed information detection step, a resonance frequency estimate step for time-series estimating a torsional resonance frequency of the rotation acceleration information from the rotation acceleration information obtained in the rotation acceleration information detection step, a correlation calculation step for, regarding left and right wheels of driving wheels, calculating a time series correlation of the rotation acceleration information of the left and right wheels calculated in the rotation acceleration information calculation step, and a determination step for determining a decrease in pressure of the tires based on the estimated torsional resonance frequency, wherein in a case where the correlation calculated in the correlation calculation step exceeds a predetermined threshold value, the resonance frequency estimate step takes that a periodic noise from the driving wheels of the vehicle is generated in the vicinity of the torsional resonance frequency and stops estimating the torsional resonance frequency.

(6) Preferably, in the detection method of (4) or (5) described above, the correlation calculation step calculates a time series correlation of the rotation acceleration information of the left and right wheels passing through a band-pass filter for letting only a frequency bandwidth in the vicinity of the torsional resonance frequency pass.

(7) A non-transitory computer readable medium encoded with a computer program containing instructions stored therein according to a fifth aspect of the present invention causes a computer, for detecting a decrease in pressure of tires based on a resonance frequency of the tires of a traveling vehicle, to function as rotation acceleration information calculation means for calculating rotation acceleration information of the tires from rotation speed information obtained by rotation speed information detection means for regularly detecting the rotation speed information of the tires of wheels of the vehicle; resonance frequency estimate means for time-series estimating a torsional resonance frequency of the rotation speed information from the rotation speed information; correlation calculation means for, regarding left and right wheels of driving wheels, calculating a time series correlation of the rotation acceleration information of the left and right wheels calculated by the rotation acceleration information calculation means; and determination means for determining the decrease in the pressure of the tires based on the estimated torsional resonance frequency, wherein in a case where the correlation calculated by the correlation calculation means exceeds a predetermined threshold value, the resonance frequency estimate means takes that a periodic noise from the driving wheels of the vehicle is generated in the vicinity of the torsional resonance frequency and stops estimating the torsional resonance frequency.

(8) A non-transitory computer readable medium encoded with a computer program containing instructions stored therein according to a sixth aspect of the present invention causes a computer, for detecting a decrease in pressure of tires based on a resonance frequency of the tires of a traveling vehicle, to function as rotation acceleration information calculation means for calculating rotation acceleration information of the tires from rotation speed information obtained by rotation speed information detection means for regularly detecting the rotation speed information of the tires of wheels of the vehicle; resonance frequency estimate means for time-series estimating a torsional resonance frequency of the rotation acceleration information from the rotation acceleration information obtained by the rotation acceleration information detection means; correlation calculation means for, regarding left and right wheels of driving wheels, calculating a time series correlation of the rotation acceleration information of the left and right wheels calculated by the rotation acceleration information calculation means; and determination means for determining the decrease in the pressure of the tires based on the estimated torsional resonance frequency, wherein in a case where the correlation calculated by the correlation calculation means exceeds a predetermined threshold value, the resonance frequency estimate means takes that a periodic noise from the driving wheels of the vehicle is generated in the vicinity of the torsional resonance frequency and stops estimating the torsional resonance frequency.

Advantageous Effects of Invention

According to the detection apparatus and the method, and the computer readable medium of the present invention, the influence of the periodic noise due to the driving wheels can be removed or suppressed so as to eliminate the erroneous alarm or the non-alarm of the decrease in the tire pressure.

DESCRIPTION OF EMBODIMENTS

Figure 1:
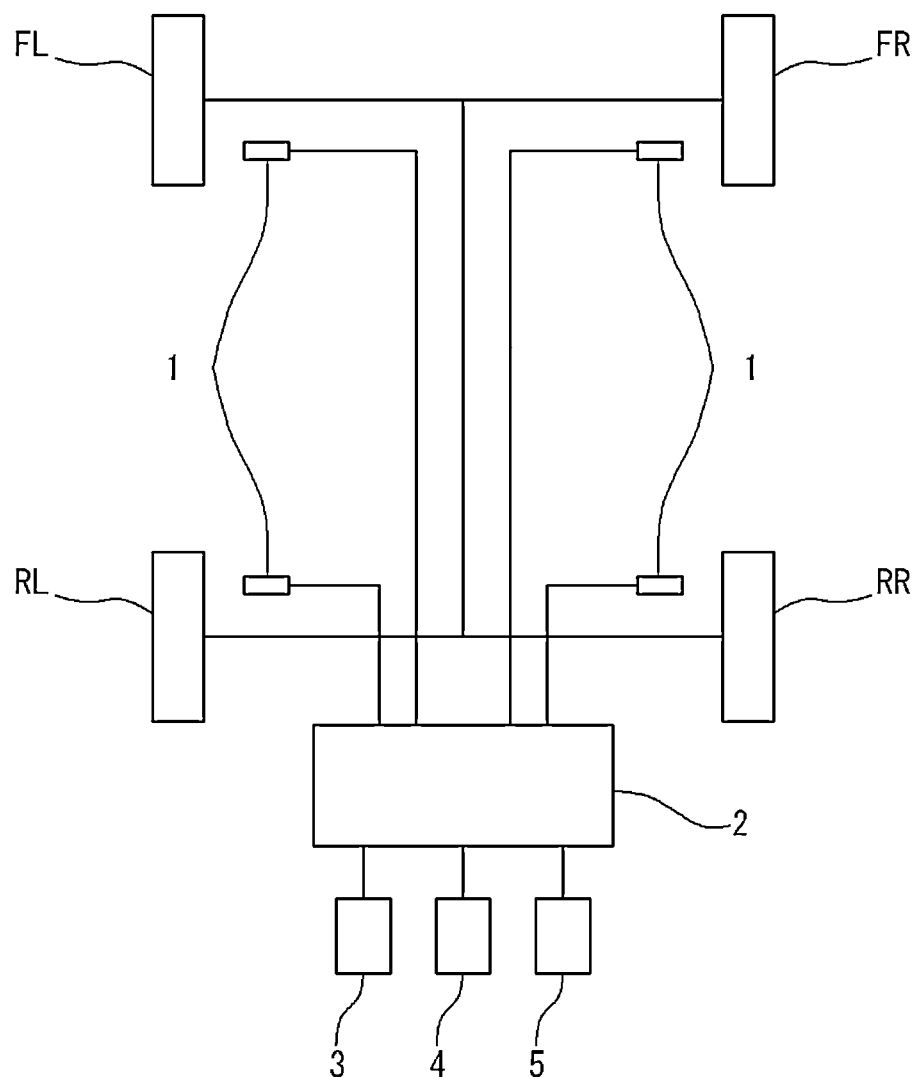
FIG. 1 is a block diagram showing one embodiment of a detection apparatus of the present invention.

Hereinafter, with reference to the attached drawings, an embodiment of a tire pressure decrease detection apparatus, a method, and a program of the present invention will be described in detail. As shown in FIG. 1, the detection apparatus according to one embodiment of the present invention is provided with normal wheel speed detection means (rotation speed information detection means) 1 provided in relation to tires in order to detect rotation speed information of a left front wheel (FL), a right front wheel (FR), a left rear wheel (RL), and a right rear wheel (RR) of four tires provided in a four-wheeled vehicle.

As the wheel speed detection means 1, there can be used a wheel speed sensor for generating a rotation pulse with using an electromagnetic pickup or the like so as to measure rotation angular velocity and wheel speed from the number of the pulse, an angular speed sensor including a sensor for generating electric power with utilizing rotation like a dynamo so as to measure the rotation angular vilocity and the wheel speed from voltage thereof, or the like. An output of the wheel speed detection means 1 is given to a control unit 2 serving as a computer such as an ABS. Connected to the control unit 2 are display 3 composed of a liquid crystal display element, a plasma display element, a CRT, or the like for displaying deflation of the tires for example; an initialization button 4 capable of being operated by a driver; and an alarm 5 for notifying the driver of the deflation of the tires.

Figure 2:
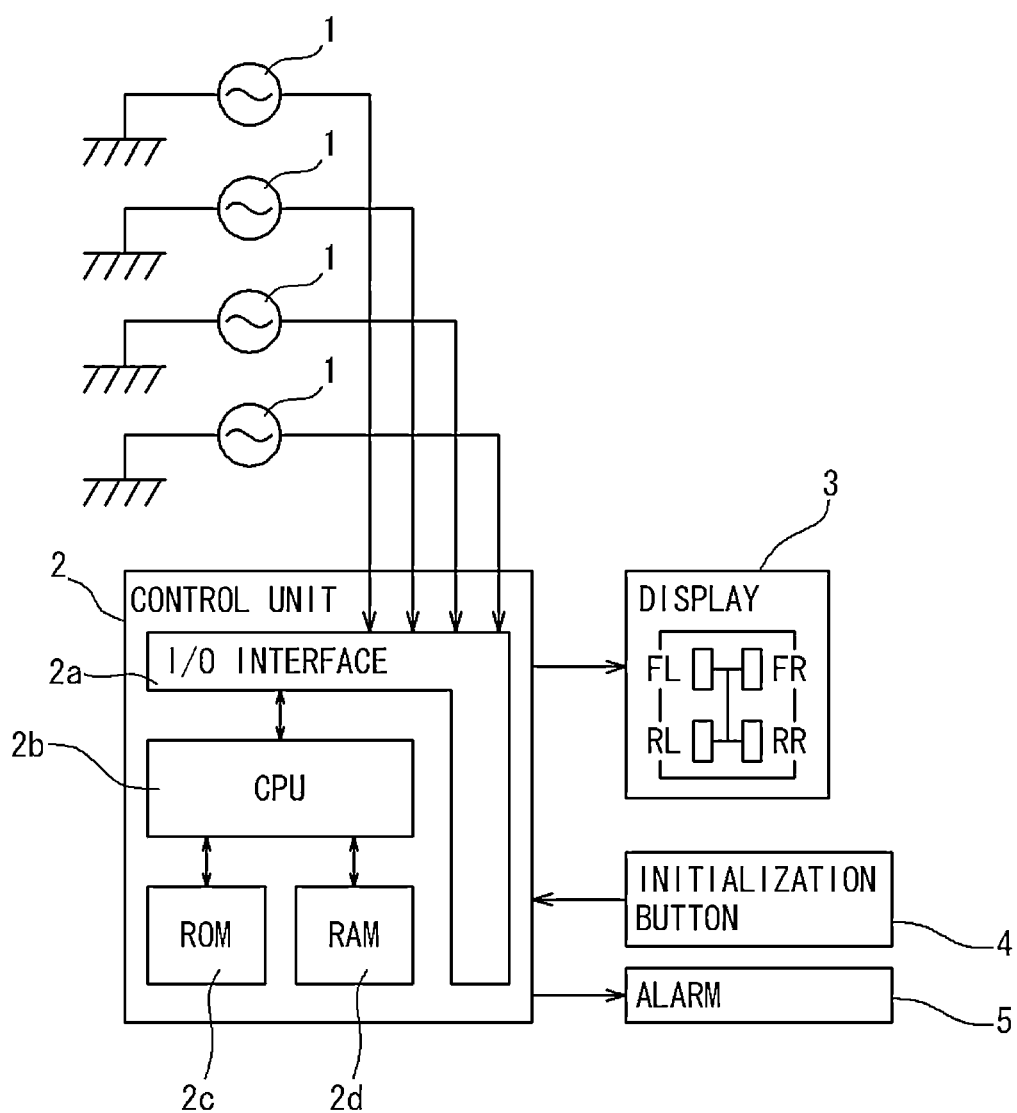
FIG. 2 is a block diagram showing an electric configuration of the detection apparatus shown in FIG. 1.

As shown in FIG. 2, the control unit 2 includes an I/O interface 2a required for sending and receiving signals to and from an external device, a CPU 2b functioning as a center of arithmetic processing, a ROM 2c in which a control operation program of the CPU 2b is stored, and a RAM 2d in which data and the like are temporarily written and the written data is read out when the CPU 2b performs control operation.

In the wheel speed detection means 1, a pulse signal corresponding to the rotation number of the tires (hereinafter, also referred to as the "wheel speed pulse") is outputted. By re-sampling the wheel speed pulse by a predetermined cycle $\Delta T$ (sec) such as $\Delta T=0.005$ seconds, time series data of wheel speed signals can be obtained. Since a resonance frequency in the torsional direction of the focused tire appears in the vicinity of tens of Hz, there is a need for setting a sampling cycle in such a manner that the resonance frequency is included in the Nyquist frequency.

The detection apparatus according to the present embodiment mainly includes the wheel speed detection means (rotation speed information detection means) 1, rotation acceleration information calculation means for calculating rotation acceleration information of the tires from the rotation speed information obtained by the wheel speed detection means 1, resonance frequency estimate means for time-series estimating a torsional resonance frequency of the rotation acceleration information from the rotation acceleration information obtained by the rotation acceleration information detection means, correlation calculation means for, regarding left and right wheels of driving wheels, calculating a time series correlation of the rotation acceleration information of the left and right wheels calculated by the rotation acceleration information calculation means, and determination means for determining a decrease in pressure of the tires based on the estimated torsional resonance frequency. In a case where the correlation calculated by the correlation calculation means exceeds a predetermined threshold value, the resonance frequency estimate means takes that a periodic noise from the driving wheels of the vehicle is generated in the vicinity of the torsional resonance frequency and stops estimating the torsional resonance frequency. The computer program according to the present embodiment is installed in the control unit 2 and causes the control unit 2 to function as the rotation acceleration information calculation means, the resonance frequency estimate means, the correlation calculation means, and the determination means.

The torsional resonance frequency can be estimated by performing a time series analysis for example to the rotation acceleration information based on the secondary autoregressive (AR) model. When the obtained torsional resonance frequency exceeds the predetermined threshold value to be less than the torsional resonance frequency calculated at the time of initialization, it is determined that the tire is deflacted and the alarm 5 issues an alarm.

In the present invention, at the time of determining the decrease in the tire pressure focusing on a change in the torsional resonance frequency, in consideration with the fact that the periodic noise is generated in the vicinity of the torsional resonance frequency of the tires due to vehicle speed, a gear position, or the like in the driving wheels of the vehicle and there is a fear that an erroneous alarm and non-alarm is caused because of this, estimate of the torsional resonance frequency is stopped in a case where the periodic noise is generated.

Road surface inputs from the left and right wheels in the vehicle are usually independent inputs from each other. Thus, normally, there is no correlation between left and right wheel acceleration. That is, the left and right road surface inputs in the vicinity of 30 to 50 Hz as the vicinity of the torsional resonance frequency can be regarded as random. Thus, the correlation between the wheel acceleration of the left and right wheels is almost zero. However, regarding a periodic vibration (driving noise) passing from the engine through a driving system and influencing the wheel acceleration, the left and right wheels of the driving wheels have the same-phase vibration component. When this vibration component appears in the frequency close to the original torsional resonance frequency, the time-series estimated value of the resonance frequency is pulled by the vibration component, so that the original torsional resonance frequency cannot be estimated, thus leading to the erroneous report and the non-alarm of the tire pressure decrease detection device.

In the present embodiment, correlation coefficients R or contributions $R^2$ of the time of generation of the driving noise and of the time of non-generation are determined by an experiment in advance, and a threshold value is set in the middle. When the calculated correlation coefficient or contribution of the wheel acceleration of the left and right wheels of the driving wheels becomes more than the threshold value, the time-series estimate of the torsional resonance frequency is stopped. That is, data of the wheel acceleration obtained when the correlation coefficient or the contribution becomes more than the threshold value is rejected. In a case where the contribution $R^2$ is adopted as the correlation, the threshold value can take a value within a range from 0.3 to 0.5 for example.

Regarding the number of the data for calculating the correlation, when the number of data is too small, precision is lowered, and when the number of the data is too large, the precision is improved but determination of estimate stop is delayed. Thus, the number is desirably about 100 (for 400 ms in a case of sampling by 4 ms) to 500 (for 2 s in a case of sampling by 4 ms). The correlation may be calculated by the iterative least squares method setting a forgetting factor of proper magnitude corresponding to the data number.

The closer the driving noise is to the torsional resonance frequency, the more an influence thereof is. Thus, in the tire in which the torsional resonance frequency is in a range from 30 to 50 Hz for example, desirably, a band-pass filter of 30 to 50 Hz is applied to the wheel acceleration of the left and right wheels and then the correlation coefficient or the contribution is calculated. Without the band-pass filter, even in a case where there is the driving noise in a frequency bandwidth not exerting a harmful influence on the estimate of the torsional resonance frequency, the calculated value of the correlation coefficient is increased. Thus, although the resonance frequency can be accurately estimated, the estimate is stopped. However, when the band-pass filter is applied, the data in the frequency bandwidth not exerting a harmful influence on the estimate of the torsional resonance frequency is rejected, and the calculated value of the correlation coefficient is not increased. In this case, since the estimate of the resonance frequency is not stopped, an estimating opportunity is not wastefully reduced.

Figure 3:
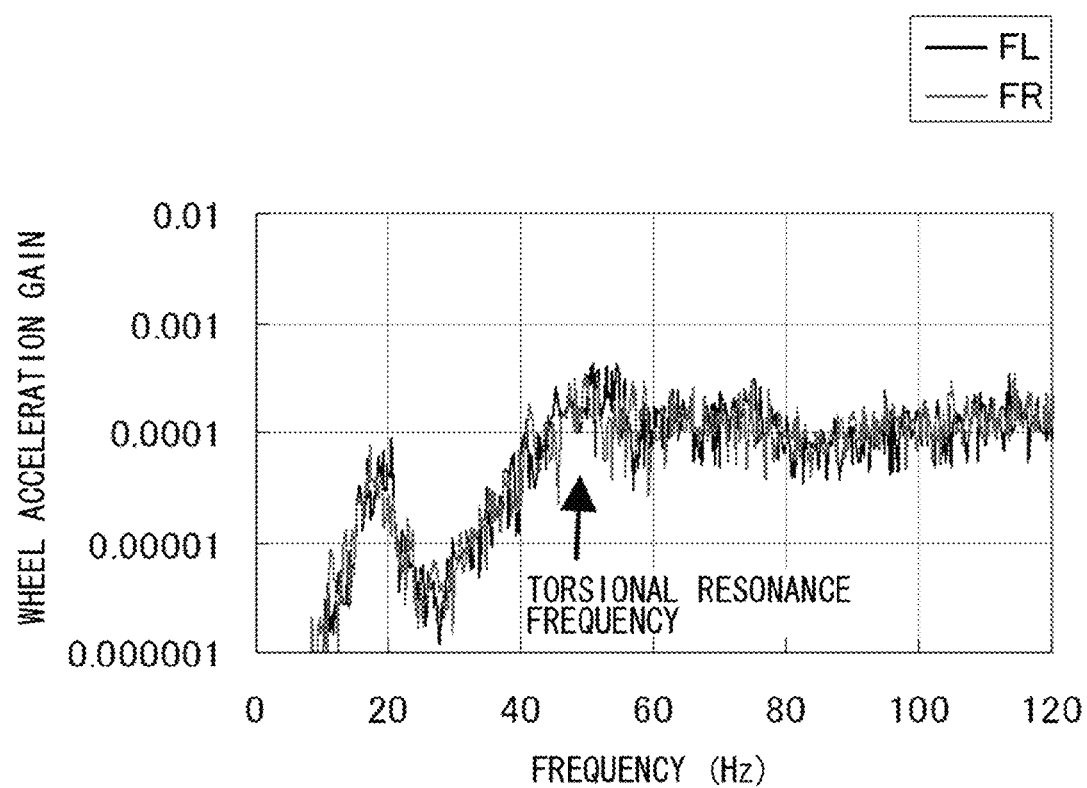
FIG. 3 is a chart showing one example of wheel acceleration spectrum of left and right wheels of driving wheels in a case where there is no driving noise.
Figure 4:
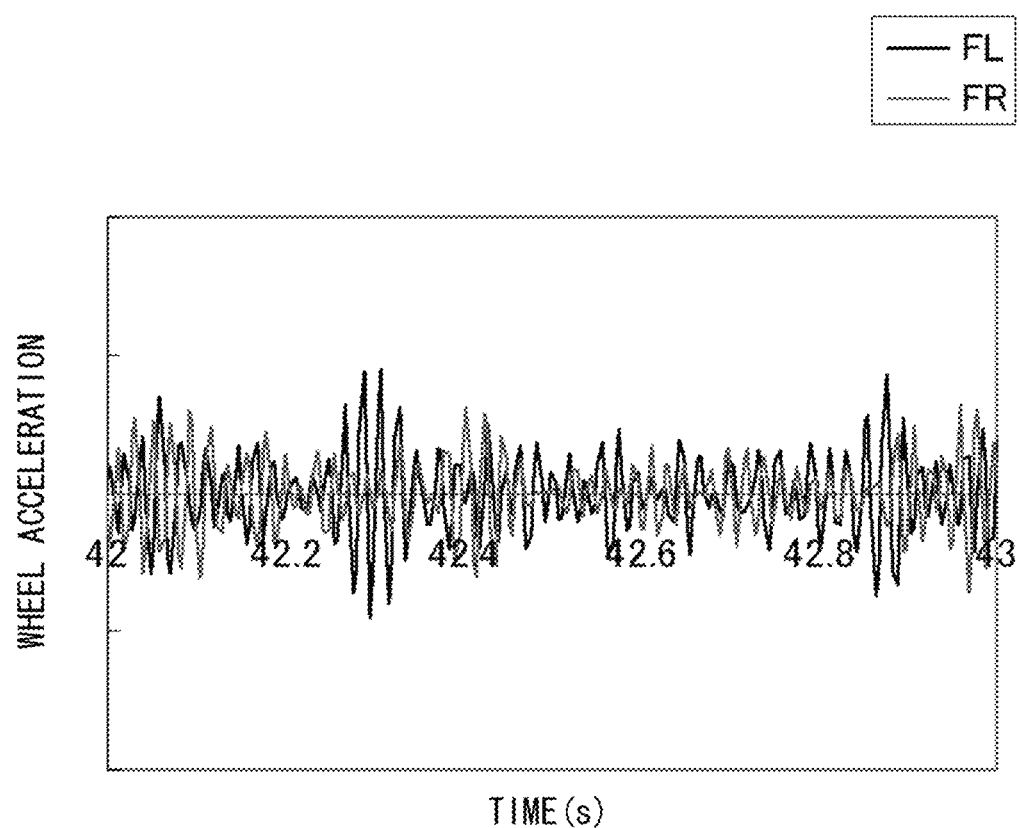
FIG. 4 is a chart showing a time series change in wheel acceleration of the left and right wheels of the driving wheels in a case where there is no driving noise.
Figure 5:
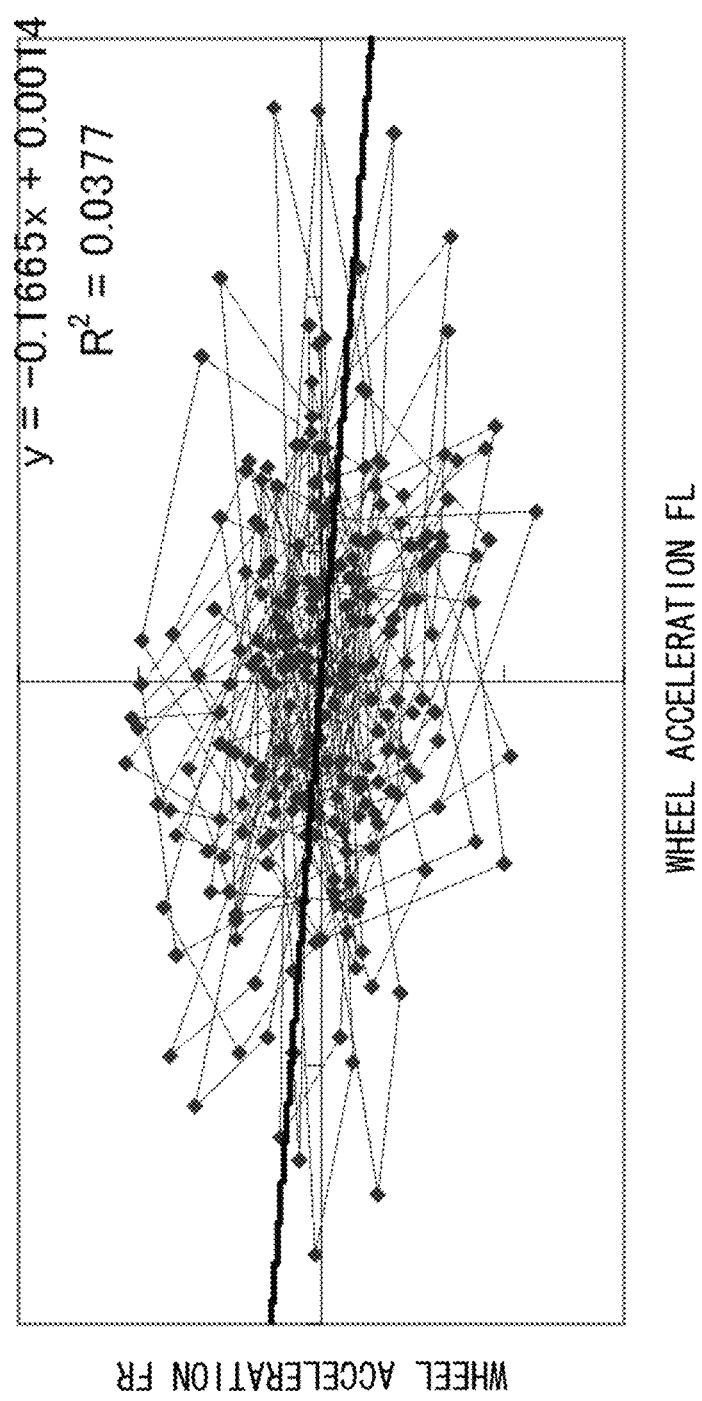
FIG. 5 is a chart showing the wheel acceleration of the left and right wheels of the driving wheels in a case where there is no driving noise.

FIG. 3 is a chart showing one example of wheel acceleration spectrum of the left and right wheels of the driving wheels in a case where there is no driving noise, FIG. 4 is a chart showing a time series change in the wheel acceleration of the left and right wheels in the same case, and FIG. 5 is a chart showing the wheel acceleration of the left and right wheels in the same case. The road surface inputs from the left and right wheels in the vehicle are usually independent inputs from each other. Thus, as shown in FIG. 5, regarding the left and right wheel acceleration, the contribution $R^2$ is as very small as 0.0377, and there is no correlation between the both.

Figure 6:
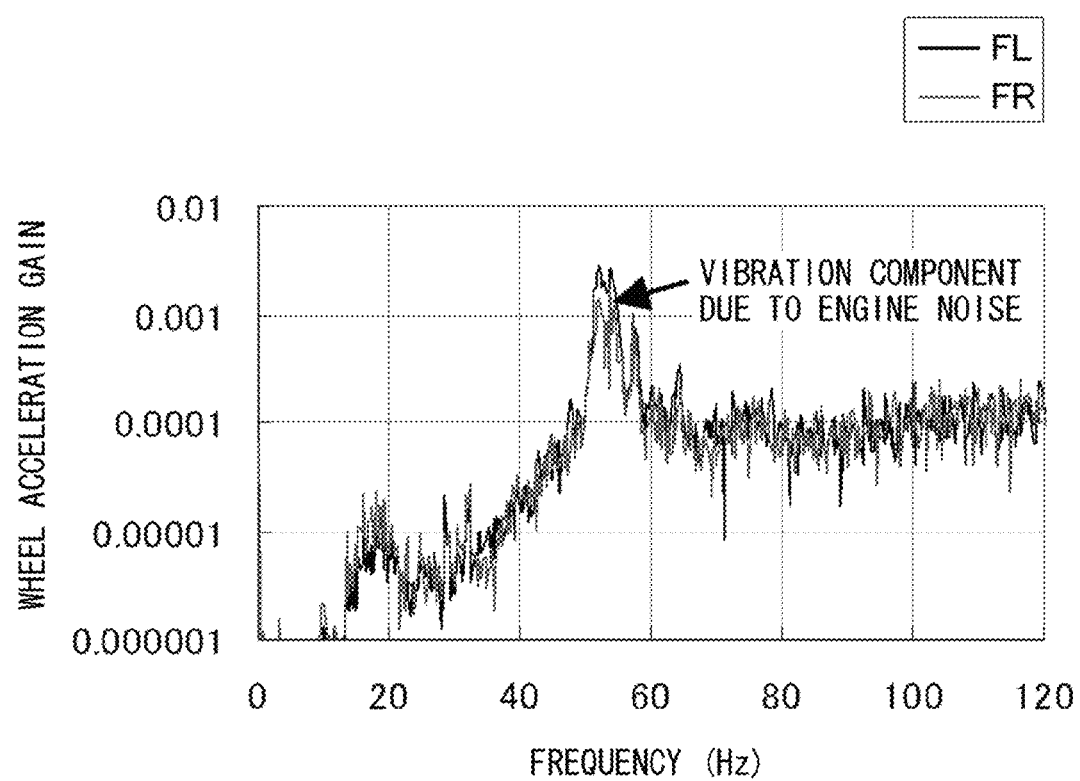
FIG. 6 is a chart showing one example of the wheel acceleration spectrum of the left and right wheels of the driving wheels in a case where a driving noise is generated.
Figure 7:
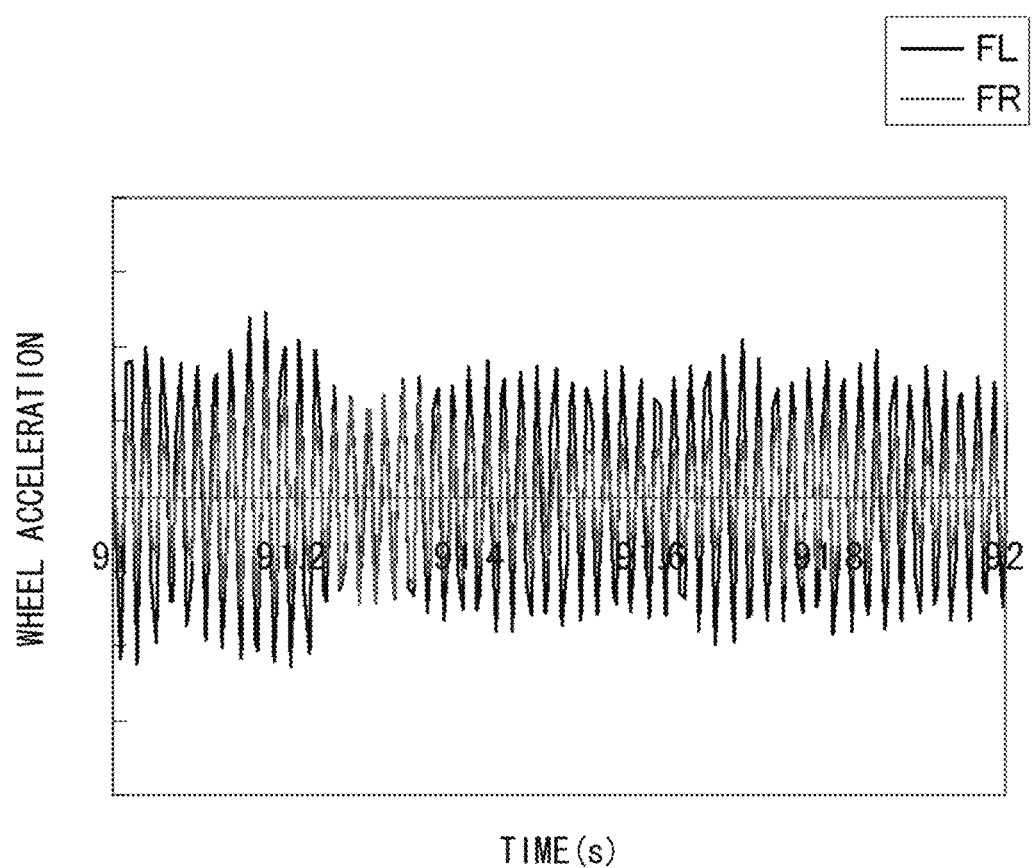
FIG. 7 is a chart showing a time series change in the wheel acceleration of the left and right wheels in a case where the driving noise is generated.
Figure 8:
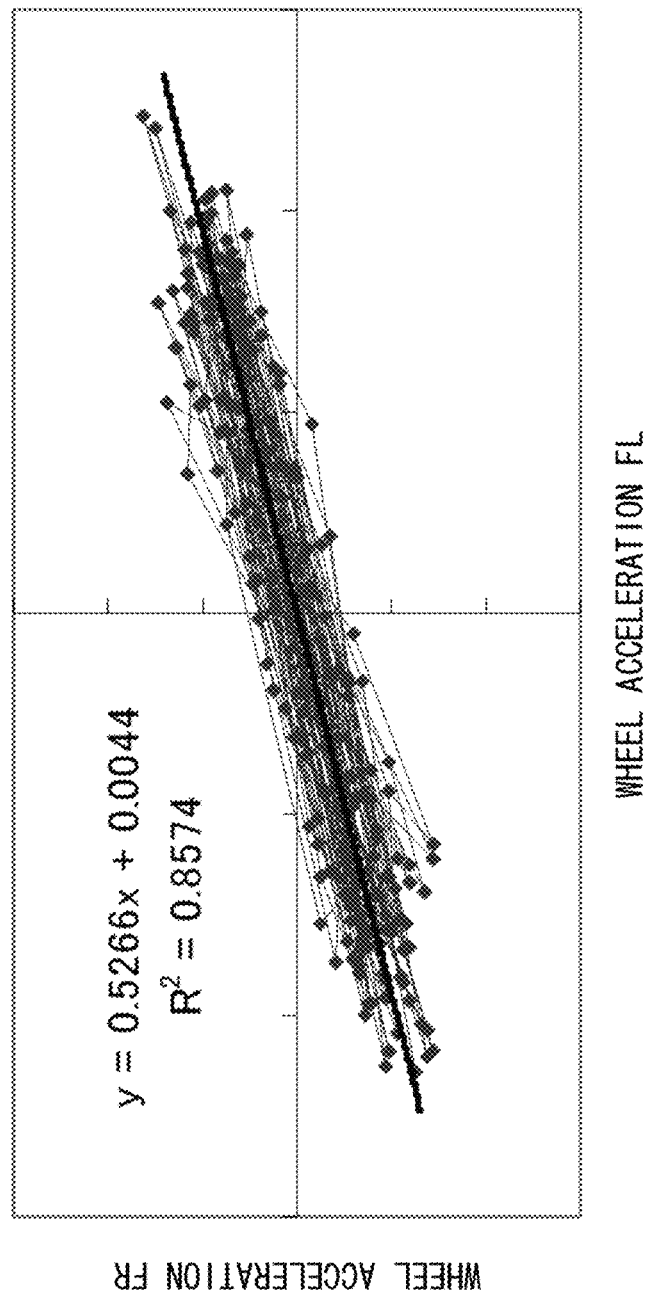
FIG. 8 is a chart showing the wheel acceleration of the left and right wheels in a case where the driving noise is generated.
Figure 9:
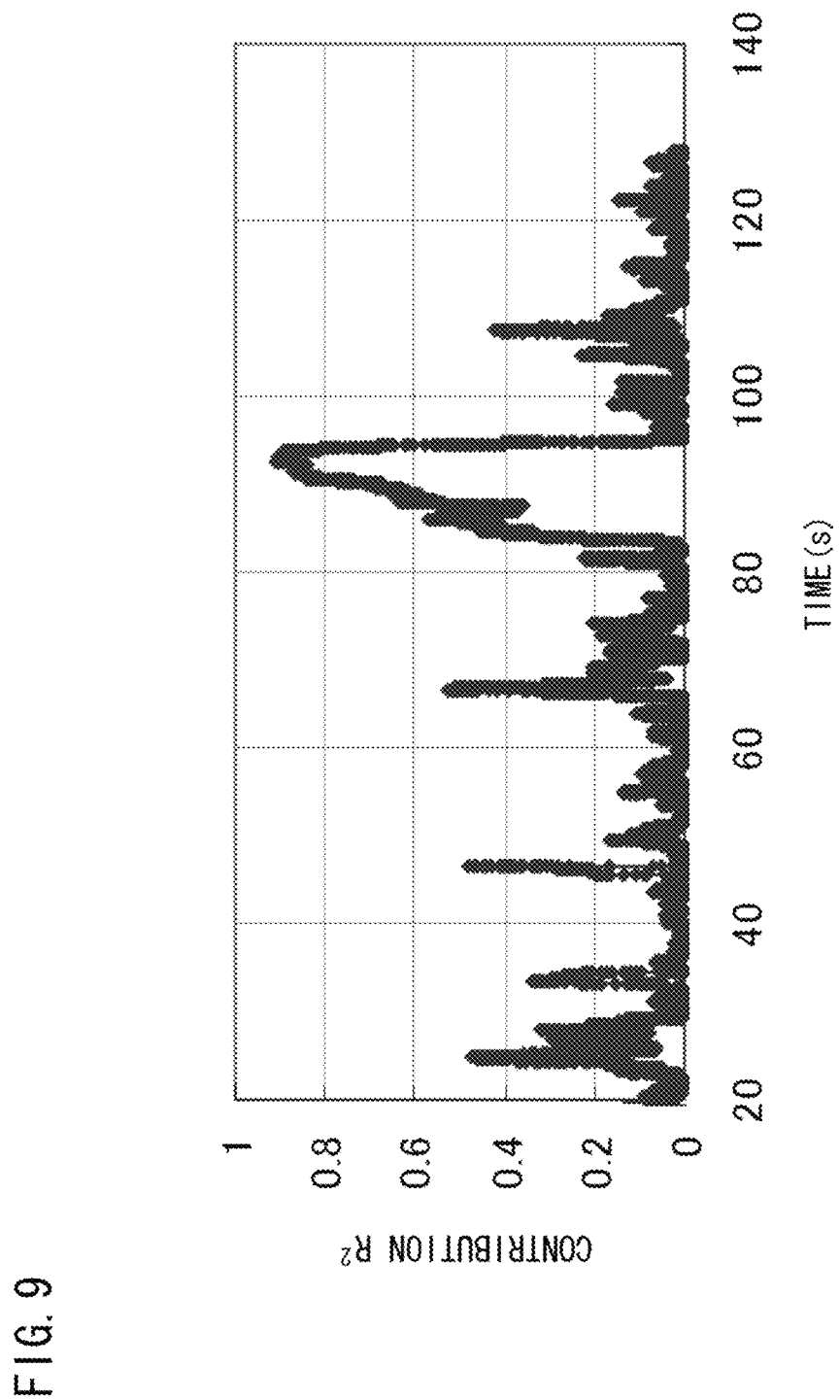
FIG. 9 is a chart showing a time series change in a correlation (contribution) of the wheel acceleration of the left and right wheels.

Meanwhile, in a case where the driving noise is generated, the left and right wheels have the same-phase vibration component appearing in the wheel acceleration. FIG. 6 is a chart showing one example of the wheel acceleration spectrum of the left and right wheels of the driving wheels in a case where the driving noise is generated, FIG. 7 is a chart showing a time series change in the wheel acceleration of the left and right wheels in the same case, and FIG. 8 is a chart showing the wheel acceleration of the left and right wheels in the same case. In FIG. 6, a part shown by an arrow is the vibration component due to the engine noise. As shown in FIG. 8, in a case where the driving noise is generated, the correlation (contribution) of the wheel acceleration of the left and right wheels is as large as 0.8574, the time-series estimated value of the torsional resonance frequency is pulled by the vibration component described above (see FIG. 6), and the original tire torsional resonance frequency cannot be estimated. FIG. 9 shows a time series change in the correlation (contribution) of the wheel acceleration of the left and right wheels, indicating that the driving noise is generated in the vicinity of 80 to 100 seconds and the correlation of the wheel acceleration of the left and right wheels is increased.

EXAMPLE

Next, an example of the detection method of the present invention will be described. The present invention is not limited only to this example.

Example 1

The detection method of the present invention was applied to front wheels of a FF vehicle. Wheel speed was sampled by a sampling cycle of 4 ms, and a torsional resonance frequency of wheel acceleration calculated based on data applied to the band-pass filter of 30 to 50 Hz was time-series estimated by the secondary AR model. A correlation (contribution) was calculated regarding wheel acceleration of left and right wheels of the front wheels. Regarding the contribution, 250 data (for 1 second) were calculated for each of the left and right wheels of the front wheels, and the data in a case where the contribution is more than 0.4 were rejected.

Comparative Example 1

As well as Example 1, wheel speed was sampled and a torsional resonance frequency of wheel acceleration calculated based on the obtained wheel speed was time-series estimated. Unlike Example 1, a contribution was not calculated, and therefore, rejection of data by the contribution was not performed.

Figure 10:
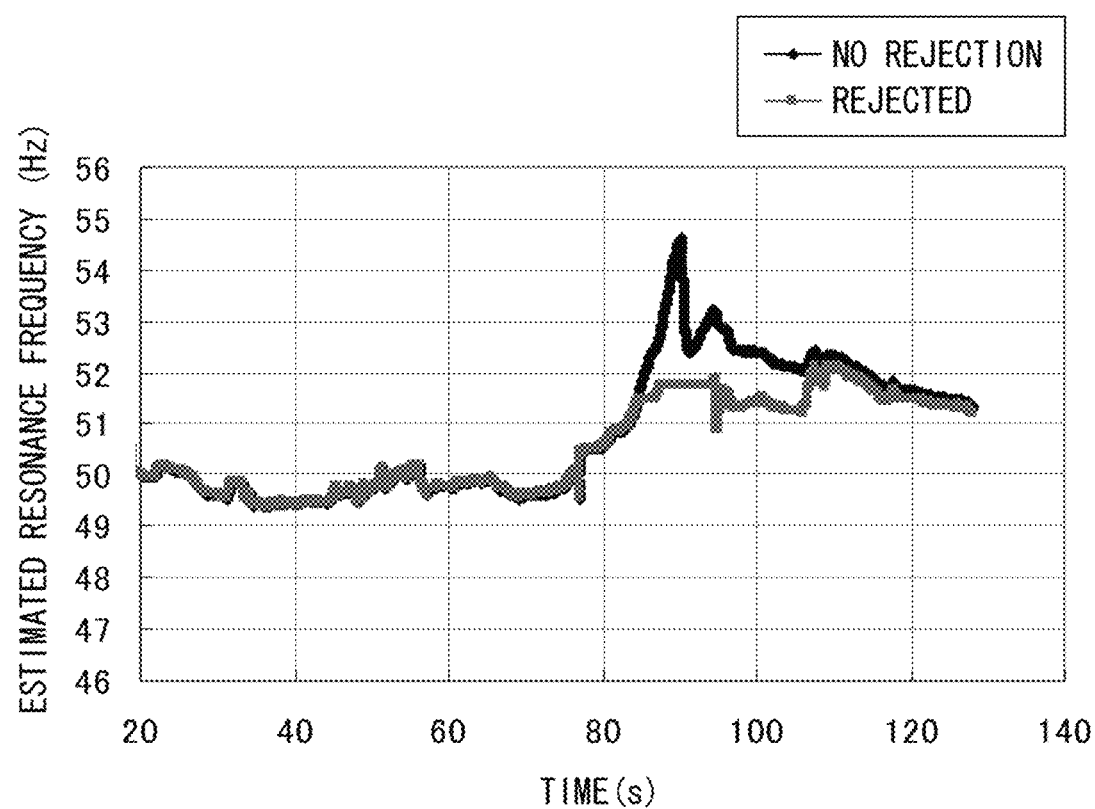
FIG. 10 is a chart showing a time series change in an estimated resonance frequency of the left wheel.
Figure 11:
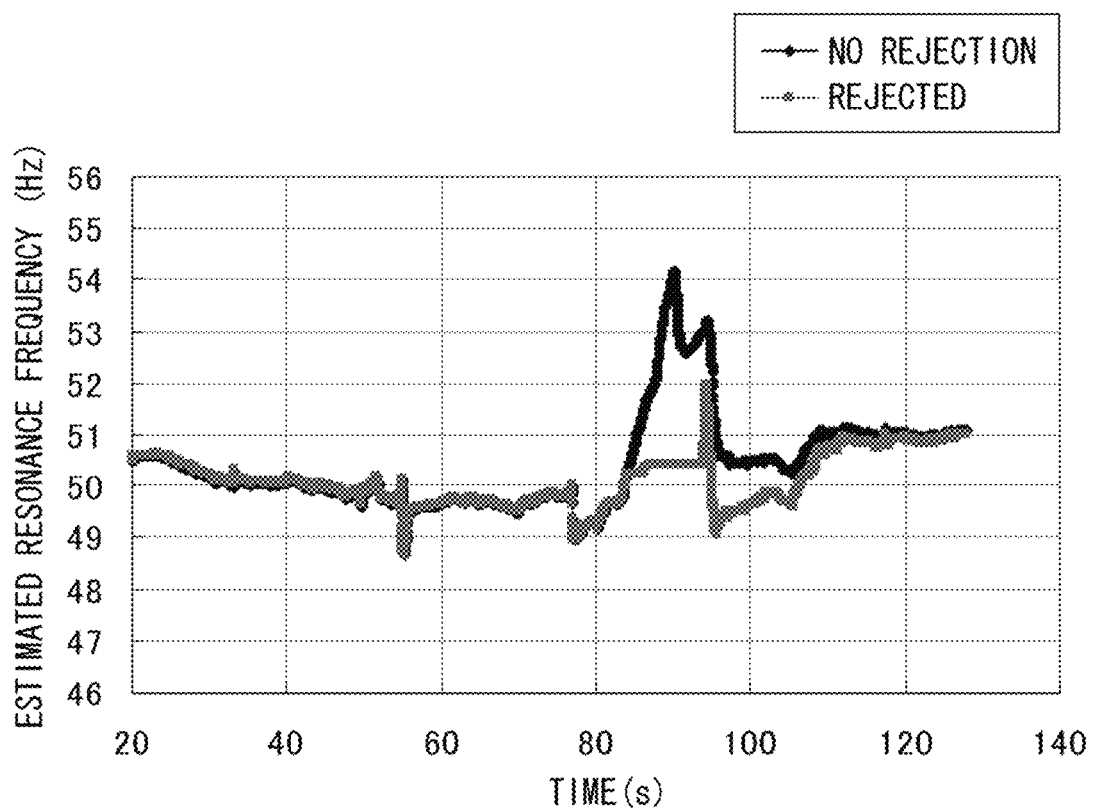
FIG. 11 is a chart showing a time series change in an estimated resonance frequency of the right wheel.

FIG. 10 shows a time series change in the estimated resonance frequency of the left wheel, and FIG. 11 shows a time series change in the estimated resonance frequency of the right wheel. In Example 1 in which the rejection by the contribution was performed, it is found that the change in the estimated resonance frequency is decreased.

[Other Modification]

It should be noted that the embodiment disclosed herein is thought to be not restriction but only an example in all aspects. The scope of the present invention is indicated not by the meaning described above but by the claims, and is intended to include equivalent meanings to the claims and all modifications within the scope.

For example, in the above embodiment, the torsional resonance frequency of the rotation acceleration information of the tires is time-series estimated. However, a torsional resonance frequency of rotation speed information of the tires can be time-series estimated and the decrease in the pressure of the tires can be determined based on the estimated torsional resonance frequency. Even in this case, regarding left and right wheels of driving wheels, a time series correlation of the rotation acceleration information of the left and right wheels is calculated by the correlation calculation means. In a case where the correlation calculated by the correlation calculation means exceeds a predetermined threshold value, taking that the periodic noise from the driving wheels of the vehicle is generated in the vicinity of the torsional resonance frequency, the estimate of the torsional resonance frequency is stopped.

REFERENCE SIGNS LIST

1: WHEEL SPEED DETECTION MEANS
2: CONTROL UNIT
2a: INTERFACE
2b: CPU
2c: ROM
2d: RAM
3: DISPLAY
4: INITIALIZATION BUTTON
5: ALARM

What is claimed is:

1. A tire pressure decreased detection apparatus comprising:
a rotation speed sensor configured to regularly detect rotation speed information of tires of wheels of a vehicle;
a band-pass filter; and
a processor configured to:
calculate rotation acceleration information of the tires from the rotation speed information obtained by the rotation speed sensor,
time-series estimate a torsional resonance frequency of the rotation speed information from the rotation speed information obtained by the rotation speed sensor, the band-pass filter letting only a frequency bandwidth in the vicinity of the torsional resonance frequency pass,
calculate, regarding left and right wheels of driving wheels, a correlation coefficient or contribution of the rotation acceleration information of the left and right wheels passing through the band-pass filter, and
determine a decrease in pressure of the tires based on the estimated torsional resonance frequency,
wherein in a case where the calculated correlation coefficient or contribution of the rotation acceleration information of the left and right wheels passing through the band-pass filter exceeds a predetermined threshold value, the processor is configured to determine that a periodic noise from the driving wheels of the vehicle is generated in the vicinity of the torsional resonance frequency and to stop estimating the torsional resonance frequency, the predetermined threshold value being determined based on correlation coefficients or contributions of a time of generating of a driving noise and of the time of non-generation obtained by an experiment in advance, and
wherein the processor is further configured to generate a report regarding the tire pressure, which eliminates an erroneous alarm or non-alarm, based on the determined decrease in pressure in the determination step, to affect operation of the vehicle.

2. A tire pressure decrease detection apparatus comprising:
a speed sensor configured to regularly detect rotation speed information of tires of wheels of a vehicle;
a band-pass filter; and
a processor configured to:
calculate rotation acceleration information of the tires from the rotation speed information obtained by the speed sensor,
time-series estimate a torsional resonance frequency of the rotation acceleration information from the calculated rotation acceleration information, the band-pass filter letting only a frequency bandwidth in the vicinity of the torsional resonance frequency pass,
calculate, regarding left and right wheels of driving wheels, a correlation coefficient or contribution of the rotation acceleration information of the left and right wheels passing through the band-pass filter, and
determine a decrease in pressure of the tires based on the estimated torsional resonance frequency,
wherein in a case where the calculated correlation coefficient or contribution of the rotation acceleration information of the left and right wheels passing through the band-pass filter exceeds a predetermined threshold value, the processor is configured to determine that a periodic noise from the driving wheels of the vehicle is generated in the vicinity of the torsional resonance frequency and to stop estimating the torsional resonance frequency, the predetermined threshold value being determined based on correlation coefficients or contributions of a time of generating of a driving noise and of the time of non-generation obtained by an experiment in advance, and
wherein the processor is further configured to generate a report regarding the tire pressure, which eliminates an erroneous alarm or non-alarm, based on the determined decrease in pressure in the determination step, to affect operation of the vehicle.

3. A tire pressure decrease detection method including:

a rotation speed information detection step for regularly detecting rotation speed information of tires of wheels of a vehicle;

a rotation acceleration information calculation step for calculating rotation acceleration information of the tires from the rotation speed information obtained in the rotation speed information detection step;

a resonance frequency estimate step for time-series estimating a torsional resonance frequency of the rotation speed information from the rotation speed information obtained in the rotation speed information detection step;

a step of applying the rotation acceleration information to a band-pass filter, the band-pass filter letting only a frequency bandwidth in the vicinity of the torsional resonance frequency pass;

a correlation calculation step for, regarding left and right wheels of driving wheels, calculating a coefficient or contribution correlation of the rotation acceleration information of the left and right wheels passing through the band-pass filter;

a determination step for determining a decrease in pressure of the tires based on the estimated torsional resonance frequency, wherein in a case where the correlation coefficient or contribution of the rotation acceleration information of the left and right wheels passing through the band-pass filter calculated in the correlation calculation step exceeds a predetermined threshold value, the resonance frequency estimate step takes that a periodic noise from the driving wheels of the vehicle is generated in the vicinity of the torsional resonance frequency and stops estimating the torsional resonance frequency, the predetermined threshold value being determined based on correlation coefficients or contributions of a time of generating of a driving noise and of the time of non-generation obtained by an experiment in advance; and a step of applying the determined decrease in pressure in the determination step to the vehicle to generate a report regarding the tire pressure, which eliminates an erroneous alarm or non-alarm, to affect operation of the vehicle.

4. A tire pressure decrease detection method including:

a rotation speed information detection step for regularly detecting rotation speed information of tires of wheels of a vehicle;

a rotation acceleration information calculation step for calculating rotation acceleration information of the tires from the rotation speed information obtained in the rotation speed information detection step;

a resonance frequency estimate step for time-series estimating a torsional resonance frequency of the rotation acceleration information from the rotation acceleration information obtained in the rotation acceleration information detection step;

a step of applying the rotation acceleration information to a band-pass filter, the band-pass filter letting only a frequency bandwidth in the vicinity of the torsional resonance frequency pass;

a correlation calculation step for, regarding left and right wheels of driving wheels, calculating a coefficient or contribution correlation of the rotation acceleration information of the left and right wheels passing through the band-pass filter;

a determination step for determining a decrease in pressure of the tires based on the estimated torsional resonance frequency, wherein in a case where the correlation coefficient or contribution of the rotation acceleration information of the left and right wheels passing through the band-pass filter calculated in the correlation calculation step exceeds a predetermined threshold value, the resonance frequency estimate step takes that a periodic noise from the driving wheels of the vehicle is generated in the vicinity of the torsional resonance frequency and stops estimating the torsional resonance frequency, the predetermined threshold value being determined based on correlation coefficients or contributions of a time of generating of a driving noise and of the time of non-generation obtained by an experiment in advance; and a step of applying the determined decrease in pressure in the determination step to the vehicle to generate a report regarding the tire pressure, which eliminates an erroneous alarm or non-alarm, to affect operation of the vehicle.

5. A non-transitory computer readable medium encoded with a computer program containing instructions stored therein which caused a computer, for detecting a decrease in pressure of tires based on a resonance frequency of the tires of a traveling vehicle, to perform a method comprising:

calculating rotation acceleration information of the tires from the rotation speed information obtained by a rotation speed sensor regularly detecting rotation speed information of tires of wheels of the travelling vehicle;

time-series estimating a torsional resonance frequency of the rotation speed information from the calculated rotation speed information;

applying the rotation acceleration information to a band-pass filter, the band-pass filter letting only a frequency bandwidth in the vicinity of the torsional resonance frequency pass;

regarding left and right wheels of driving wheels, calculating a coefficient or contribution correlation of the rotation acceleration information of the left and right wheels passing through the band-pass filter;

determining a decrease in pressure of the tires based on the estimated torsional resonance frequency;

when the correlation coefficient or contribution of the rotation acceleration information of the left and right wheels passing through the band-pass filter calculated in the correlation calculation step exceeds a predetermined threshold value, determining that a periodic noise from the driving wheels of the vehicle is generated in the vicinity of the torsional resonance frequency and stop estimating the torsional resonance frequency, the predetermined threshold value being determined based on correlation coefficients or contributions of a time of generating of a driving noise and of the time of non-generation obtained by an experiment in advance; and applying the determined decrease in pressure in the determination step to the vehicle to generate a report regarding the tire pressure, which eliminates an erroneous alarm or non-alarm, to affect operation of the vehicle.

6. A non-transitory computer readable medium encoded with a computer program containing instructions stored therein which caused a computer, for detecting a decrease in pressure of tires based on a resonance frequency of the tires of a traveling vehicle, to perform a method comprising:
    calculating rotation acceleration information of the tires from rotation speed information obtained by a rotation speed information detection step regularly detecting the rotation speed information of the tires of wheels of the traveling vehicle;
    time-series estimating a torsional resonance frequency of the rotation acceleration information from the calculated rotation acceleration information;
    applying the rotation acceleration information to a band-pass filter, the band-pass filter letting only a frequency bandwidth in the vicinity of the torsional resonance frequency pass;
    regarding left and right wheels of driving wheels, calculating a coefficient or contribution correlation of the rotation acceleration information of the left and right wheels passing through the band-pass filter;
    determining a decrease in pressure of the tires based on the estimated torsional resonance frequency;
    when the correlation coefficient or contribution of the rotation acceleration information of the left and right wheels passing through the band-pass filter calculated in the correlation calculation step exceeds a predetermined threshold value, determining that a periodic noise from the driving wheels of the vehicle is generated in the vicinity of the torsional resonance frequency and stop estimating the torsional resonance frequency, the predetermined threshold value being determined based on correlation coefficients or contributions of a time of generating of a driving noise and of the time of non-generation obtained by an experiment in advance; and
applying the determined decrease in pressure in the determination step to the vehicle to generate a report regarding the tire pressure, which eliminates an erroneous alarm or non-alarm, to affect operation of the vehicle.

* * * * *